United States Patent [19]
Rivet

[11] Patent Number: 6,034,173
[45] Date of Patent: Mar. 7, 2000

[54] TWO-STEP PROCESS FOR THE PREPARATION OF (CO) POLYCHLOROPRENE

[75] Inventor: Nathalie Peresleni Rivet, Grenoble, France

[73] Assignee: Enichem Elastomeres France S.A., Courbevoie, France

[21] Appl. No.: 08/605,931

[22] Filed: Feb. 23, 1996

[30] Foreign Application Priority Data

Feb. 24, 1995 [FR] France .................................. 95 02390

[51] Int. Cl.⁷ .............................. C08F 2/24; C08J 3/05; C08K 5/04
[52] U.S. Cl. ............................................ 524/834; 526/295
[58] Field of Search .............................................. 524/834

[56] References Cited

U.S. PATENT DOCUMENTS 3,838,141  9/1974  Turner .................................... 526/295
5,322,886  6/1994  Sauterey ................................. 524/834

FOREIGN PATENT DOCUMENTS 457642  11/1991  European Pat. Off. .

*Primary Examiner*—Christopher Henderson
*Attorney, Agent, or Firm*—Burns, Doane, Swecker & Mathis, L.L.P.

[57] ABSTRACT

The present invention relates to the preparation of (co) polychloroprene latex in water emulsion, in the presence of an emulsifying system which comprises a first step (A) wherein a fraction $f_1$ of monomers is used together with an emulsifying system which comprises a non-carboxylic ionic emulsifying agent (Ea1), a non-ionic emulsifying agent with a low HLB (Eb1) and a non-ionic emulsifying agent with a high HLB (Eb2), and a second step (B) wherein the reaction medium of step (A) is fed with the remaining fraction $f_2$ of (co)monomers and the remaining emulsifying system.

19 Claims, No Drawings

TWO-STEP PROCESS FOR THE PREPARATION OF (CO) POLYCHLOROPRENE

BACKGROUND OF THE INVENTION

1. Field of the Invention

The present invention relates to a process for the preparation of (co)polychloroprene latex in water emulsion, in the presence of an emulsifying system which does not require the presence of surface-active agents consisting of carboxylic acids.

2. Description of the Related Art (Co)polychloroprene latexes are produced with the classical method of emulsion polymerization, in the presence of emulsifying agents.

If the polymerization is carried out in an alkaline medium, the emulsifying agents usually comprise alkaline salts of rosin. But in some applications, such as formulations for adhesives with a solvent, the presence of rosin is not advisable in too high a quantity as this can cause separation of the phases in the presence of metal oxides.

If a polymerization in an acid medium is necessary, for example to copolymerize chloroprene with unsaturated carboxylic acids, it is not possible to use rosin owing to the pKa of the corresponding resinic acids. In this case resort must be made to other ionic surface-active agents, such as those containing sulphonate or sulphate groups.

Patent FR-A-2 333 818 describes a process for the production of concentrated latexes of polychloroprene which uses, for 100 parts of monomer, from 3 to 6 parts by weight of ionic emulsifying agents together with from 0.5 to 6 parts by weight of non-ionic emulsifying agents. This relatively high quantity of ionic emulsifying agent of the sulphate or sulphonate type has several disadvantages. In fact during polymerization the exothermic reaction is difficult to control and the heat which develops can exceed the capacity of the heat transfer of the polymerization plant. The higher the concentration of monomers in the aqueous phase, the more delicate the control of the reaction becomes. On the other hand in numerous applications it is advisable to have latexes with a high content of solids, preferably at least equal to 55%, as this creates fewer problems of storage, handling and transport.

The joint addition of a non-ionic surface-active agent enables, as is known at present, the emulsion to be stabilized and the gel point to be lowered. According to the above-mentioned document, the quantity of ionic emulsifying agent should not however be less than 3% of the polymerizable monomers. In addition, the use of high quantities of non-ionic products has negative effects on the reaction kinetics and on the control of the size distribution of the polymeric particles.

Another disadvantage of using very high quantities of ionic emulsifying agents of the sulphate or sulphonate type consists in the fact that it is difficult, if not impossible, to destabilize the resulting latex by cooling in order to isolate the polymer.

On the other hand the use of latexes as such (or in the presence of ionic surface-active agents), can be hindered in certain cases by a lack of colloidal stability in the presence of polyvalent metallic ions. In certain fields of application such as finishing, impregnation (for example of fibres), formulated water glues, it is preferable for the latex not to coagulate prematurely in the presence of metal ions, such as $Ca^{++}$, $Zn^{++}$, $Al^{+++}$ or other ions which may be present in the formulations.

Patent FR-A-2 231 725 describes a process which enables the production of polychloroprene latexes which do not coagulate if electrolytes or other products present in compositions based on latex, for example zinc oxide, are added. According to the above process, the chloroprene is polymerized in emulsion without carboxylic soap in the presence of a polyvinyl alcohol. The latex obtained is not stable to storage owing to the hydrolysis of the colloid and in addition the polyvinyl alcohol reduces the resistance to water of the formulated products. This creates a problem for applications such as floor finishing.

Patent EP-A-457 642 describes a process which enables latexes to be obtained which are stable to storage and resistant to polyvalent metallic ions, characterized in that the emulsifying system comprises (a) at least one non-carboxylated ionic surface-active agent and (b) at least two non ionic surface-active agents which differ in the HLB value by 3 units or more. The latex obtained with the above process is stable to storage and resistant to metal ions, but does not have good chemical stability, i.e. it may be sensitive to various ingredients which are introduced during the formulation.

SUMMARY OF THE INVENTION

The present invention intends to overcome the disadvantages mentioned above. More specifically, the invention relates to a process for the (co)polymerization of chloroprene which allows latexes to be obtained which are stable to storage, resistant to polyvalent metal ions, with a high chemical stability and improved adhesive properties.

Another advantage of the process of the present invention consists in an increase in the productivity and improved safety.

These advantages are obtained by means of the present invention which relates to a process for the production of (co)polychloroprene latexes by the homopolymerization in water emulsion of chloroprene and/or by the copolymerization of mixtures of chloroprene and up to 50% by weight of other copolymerizable monomers, in the presence of at least one radical initiator and an emulsifying system which comprises: (a) at least one non-carboxylated ionic surface-active agent (Ea1) and (b) at least two non-ionic surface-active agents (Eb1) (Eb2) which differ from each other in the HLB number of a value which is equal to or higher than 3 units, the above process being characterized in that it comprises:

a first step (A) in which a water emulsion is prepared which contains:

a composition (Fraction $f_1$) (co)monomers/polymers with a polymer content of between 0 and 100% by dry weight in relation to the composition, an emulsifying system which comprises:

the non-carboxylated ionic emulsifying agent (Ea1) in a quantity of between 10 and 50%, preferably between 20 and 40% by weight, of the total quantity of (Ea1) used in the process, the non-ionic emulsifying agent (Eb1) having the lower HLB value, in a quantity of between 2 and 30%, preferably between 10 and 20% of the total quantity of (Eb1) used in the process, the non-ionic emulsifying agent (Eb2) having the higher HLB value, in a quantity of between 0 and 25%, preferably 0% of the total quantity of (Eb2) used in the process, a second step (B) wherein the aqueous emulsion of step (A) is fed with the remaining fraction $f_2$ ($f_1+f_2=100$ parts by weight) of (co)monomers and with the rest of the emulsifying system, to enable the polymerization to develop.

One of the essential and original characteristics of the process of the present invention lies in the fact that it uses a particular technique, with which a specific emulsifying system and particular starting mixture are prepared. This technique consists in preparing a mixture with a composition of reagents $M_1$ and subsequently feeding another composition of reagents $M_2$, with $M_1$ identical to or different from $M_2$, preferably different.

Among other things, this advantageous technique surprisingly and unexpectedly enables the production of (co) polychloroprene latexes which do not have the drawbacks of the known art and which also have high chemical stability and adhesive properties.

This process can be carried out in various ways.

DESCRIPTION OF THE PREFERRED EMBODIMENTS

According to a preferred but not limiting form of embodiment, step (A) consists in carrying out the partial or total (co)polymerization of the fraction $f_1$ of (co)monomers used, until a conversion degree is reached of at least 1%, preferably from 3 to 80%, and even more preferably from 3 to 10%, in the presence of the emulsifying system of step (A) as defined above.

The above polymerization of a part of the (co)monomers is optional. Reaction mixtures consisting only of the $f_1$ (co)monomers of step (A) are therefore not to be excluded.

According to another form of embodiment, which can possibly be combined with the preferred form, step (A) is simply carried out using a seed consisting of (co)polymers either identical or different, preferably identical, to that of the (co)polymers desired.

The process is advantageously characterized in that the fraction $f_1$ of (co)monomers present in step (A) is between 1 and 50% by weight of the total of monomers $f_1+f_{21}$ preferably between 20 and 40%.

As far as the emulsifying system is concerned, it should be noted that, according to an interesting requisite of the invention, the emulsifying system of step (A) comprises, for a quantity of 100 parts by weight of (co)monomers:

from 0.1 to 1.0, preferably from 0.5 to 0.7, parts by weight per 100 parts by weight of the emulsfying agent (Ea1), from 0.1 to 1.0, preferably from 0.2 to 0.7, parts by weight of emulsifying agent (Eb1), the latter having, preferably, an HLB of less than or equal to 11;

from 0 to 0.5, preferably 0, parts by weight of emulsifying agent (Eb2), the latter having, preferably, an HLB greater than or equal to 11.

In addition, the total quantity of the emulsifying system used in steps (A) and (B) together is preferably the following (again expressed with reference to 100 parts by weight of (co)monomers):

from 0.6 to 3 parts, preferably from 1 to 2.5 parts, by weight of (Ea1), from 0.5 to 4, preferably from 1 to 2.5, parts by weight of (Eb1) preferably having an HLB of less than or equal to 11, from 0.5 to 4, preferably from 1 to 3, parts by weight of (Eb2) preferably having an HLB value greater than or equal to 11.

In practice, in step (A) the reactor is charged with a part $f_1$ of monomers and/or with the (co)polychloroprene latex, water and the emulsifying system in order to obtain the starting emulsion. The concentration of monomers and possible preformed (co)polychloroprene is generally between 30 and 70% by weight of the total weight of the emulsion. The polymerization is carried out in the presence of radical initiators and chain transfer agents. In this phase the above emulsion fills a volume of the reactor preferably of between 3 and 40%, even more preferably between 10 and 30%, with respect to the total volume of the reactor.

Step (A) is carried out in a variable time ranging from a few seconds to several minutes, depending on the conversion degree desired, the polymerization temperature and reactivity of the monomers. If the desired conversion degree is about zero or if a (co)polychloroprene latex is used, step (A) only lasts a few seconds. For a conversion degree of between 3 and 10% and a polymerization temperature of 35° C., the duration of step (A) is between 3 and 40 minutes, more preferably between 15 and 30 minutes.

The remaining monomers (fraction $f_2$) and the remaining emulsifying system are fed (step B) to the reaction medium which is obtained at the end of step (A).

It is evident that the feeding of the mixture of reagents of step (B) can be carried out either in continuous or batchwise, preferably in continuous, with a constant or variable flow rate which can be regulated according to the desired conversion degree.

An expert in the field is able to regulate the feeding flow rate of monomers and emulsifying system of step (B) in relation to the desired conversion degree.

In this way, for a polymerization temperature of 35° C., the feeding of the fraction $f_2$ of the remaining monomers and the remaining emulsifying system in step (B) lasts from 200 to 400 minutes, preferably from 250 to 350 minutes. By varying the feeding flow rate and consequently the quantity of monomers introduced into the reaction mixture, it is possible to control and regulate, when desired, the instantaneous weight ratio monomer(s)/polymer. The other constituents of the reaction system are added to the monomers simultaneously or non-simultaneously, preferably simultaneously.

At the end of the feeding of the fraction of remaining monomers $f_2$, the conversion degree of the monomers is greater than 50%, usually greater than 80%. It is consequently preferable to let the polymerization continue (step C) until the total conversion degree is higher than or equal to 60%, preferably higher than 90%.

In the case of a copolymerization of chloroprene and monomers of another type, the proportions of the different monomers can vary in the starting reaction medium (step A) and in the feeding stream (step B). This decision is clearly left to the expert in the field. According to a more advantageous form of embodiment however, it is preferable for the ratio comonomer/chloroprene to be between, for example in step A, 0.01 and 0.05.

Monomers which can be copolymerized with chloroprene are vinylaromatic compounds, for example, styrene, vinyl toluenes, vinyl naphthalenes; unsaturated monocarboxylic and dicarboxylic acids, for example acrylic and methacrylic acid, itaconic acid, maleic acid, vinyl acetic acid, acrylic (2-carboxy methyl) acid; ester and nitrile derivatives of unsaturated carboxylic acids, in particular alkyl acrylates and methacrylates with an alkyl group having from 1 to 6 carbon atoms, acrylonitrile, methacrylonitrile; conjugated diolefins, for example 1,3-butadiene, isoprene, 1-chloro butadiene, 2,3-dichloro butadiene, 2,3-dimethyl butadiene; vinylic esters, ethers and ketones, for example vinyl acetate, vinylic methyl ether, methyl vinyl ketone; sulphur.

In an example of a preferred embodiment of the invention for obtaining latex, the chloroprene is copolymerized with an α-β unsaturated carboxylic acid in a quantity which can range from 20% by weight with respect to the monomers. The expression "monomers" refers to the total quantity of chloroprene, unsaturated carboxylic acid and, possibly, at least another unsaturated monomer without free carboxylic groups. Particularly preferred are acrylic acid and methacrylic acid (AMA), the quantity of AMA possibly representing up to 20% by weight, preferably up to 10% by weight, with respect to the total amount of monomers.

With the process of the present invention, it is possible to obtain copolymers having a content of comonomers, particularly methacrylic acid, which is higher than that obtained, with the same charge, with the batch process of the known art.

The presence of an ionic surface-active agent (Ea1) is essential for the physico-chemical stability of the emulsion. It is advantageous for this surface-active agent to be both anionic and stable to acids. Examples of non-carboxylated surface-active agents (Ea1) comprise the salts of alkaline metals or ammonium derivatives of sulphuric or phosphoric acid, for example sodium, potassium or ammonium salts of alkylsulphates, arylsulphates, alkylsulphonates, arylsulphonates, alkylaryl sulphonates, alkylphosphates, arylphosphates, alkylaryl phosphates, alkoxyethyl sulphonates, alkoxyethyl phosphonates. The alkyl radicals of these surface-active agents are usually of medium or long-chain groups with from 8 to 25 carbon atoms. Typical surface-active agents are sodium laurylsulphate, sodium laurylsulphonate, dodecylbenzene sodium sulphonate, dodecylbenzene sodium sulphate, sodium alkanesulphonates or sodium sulphonate paraffins, sodium isothionates.

Together with the anionic surface-active agent, at least 2 non-ionic surface-active agents are used (Eb1, Eb2), having an HLB value which differs by at least 3 units. The HLB numbers (hydrophilic-lipophilic balance) are well known and can be calculated by means of the equation HLB=E/5, wherein E is the % weight of hydrophilic units, see "Encyclopedia of emulsion technology", Vol.1—Basic Theory—Paul Becher (1983), pages 217–220. The difference between the HLB values of non-ionic surface-active agents is preferably higher than three units. The two non-ionic surface-active agents (Eb1) and (Eb2) can be of a lipophilic (Eb1) (HLB<11) or hydrophilic nature (Eb2) (HLB>11).

For the choice of non-ionic surface-active agents (Eb1, Eb2), reference can be made to the volume "Surfactant Science Series"—Vol.19—edited by John Cross (1987), pages 3–28. As an example, the following can be mentioned: polyoxyethylene and/or polyoxypropylene mono-, di- and trialkylphenols, in particular polyoxyethylene fatty alcohols; polyoxyethylene and/or polyoxypropylene esters of carboxylic acids, in particular the esters of fatty acids such as polyoxyethylene laurate, stearate or oleate; polyoxyethylene mono-, and di-glycerides; the alkylamides of polyoxyethylene and/or polyoxypropylene fatty acids; the esters of sorbitol or polyoxyethylene sorbitol, in particular sorbitol monolaurate; polyoxyethylene sorbitol monolaurate; ethylene oxide-propylene oxide block copolymers.

The combined use of 3 surface-active agents (Ea1, Eb1, Eb2) corresponding to 3 distinct molecules, has been described. It is taken for granted that an expert in the field knows about the possibility of substituting the ionic surface-active agent and one of the two non-ionic surface-active agents (Eb1, Eb2) with a single molecule which combines the two functions. A laurylic alcohol containing 12 moles of ethyleneoxide can be used, for example, such as Polystep B 23 of Stepan Europa.

The total quantity (ionic surface-active agent+non-ionic surface-active agents) is preferably between 1.6 and 11 parts per 100 parts by weight of monomer(s), preferably from 3 to 8 parts.

The process of the present invention can be carried out in a single reactor, but it is also possible to use several reactors.

The polymerization is carried out according to the current polymerization technique in emulsion in the presence of radical initiators and a chain transfer agent and/or elemental sulphur.

As free radical initiators, it is possible to use conventional organic peroxides or redox systems. The chain transfer agents, or modifying agents, can be selected from iodoform, alkylxantogene disulphides, alkyl mercaptans or other sulphurated organic compounds.

The presence of a disperser such as, for example, the condensation product of formaldehyde and naphthalenesulphonic acid, is not necessary for a successful embodiment of the present invention. Small quantities of the above product can be added however before, during or after polymerization.

The polymerization temperature is preferably within the range of 10 to 70° C., more preferably between 30 and 50° C. If the polymerization is carried out in an acid medium, the pH of the emulsion can be regulated to the desired value with mineral or organic acids, for example acetic acid. The exothermicity and pH variations during the reaction can be regulated by the addition of an electrolyte.

Once the desired conversion degree has been reached, the polymerization is stopped by adding conventional inhibiting agents. After the elimination of the residual monomer and possible addition of antioxidant compounds, the latex can be stored as such or the rubber can be isolated with any of the known methods, for example by coagulation on a hot or cold drum, washing and drying.

In addition to chemical stability, possibly accompanied by a certain tack, the process of the present invention has various other advantages:

a) an increase in productivity. The polymerization times are almost identical but when, for example, the polymerization is carried out batchwise in a 10 m$^3$ reactor, there is about 9 m$^3$ of latex at the end of the classical polymerization in batch. According to the process of the present invention, it is possible to obtain 9.8 m$^3$ of latex;

b) greater safety. It is well known that chloroprene is extremely toxic and inflammable and forms explosive mixtures with air. As a result, particular attention should be paid at the beginning of the polymerization of chloroprene, as at that moment the quantity of chloroprene in the reactor is very high. According to the batch process of the prior art, at the beginning of the reaction there is at least about 50% of monomer in relation to the charge and consequently in a 10 m$^3$ reactor there are at least 5 m$^3$ of chloroprene. According to the process of the present invention, there is a maximum of 50% of monomer ($f_1$) at the beginning with respect to the total quantity of monomers ($f_1+f_2$) and consequently in a 10 m$^3$ reactor there is a maximum of 2 m$^3$ present.

One of the most important applications of these latexes is the preparation of adhesives. The latexes of copolymers of chloroprene and α-β unsaturated acids are used, for example, in the gluing of metallic sheets on a cellulosic substrate such as panels of polyurethane foam or expanded polystyrene. The latex can be incorporated without problems into the formulates containing zinc oxides, magnesium oxide or other fillers such as clays and crete. According to one of the above mentioned aspects, these objects make part of the present invention.

The latexes can be advantageously used in the building industry as additives of construction and/or impermeabilization materials such as cements (for example for the finishing of cement slabs or for the production of furnishing slabs), asphalt, etc.

The present invention further relates to the use of these latexes as active ingredients:

in formulations for the lining of all types of supports, especially of the polymeric foam type, in adhesives, or in construction and/or impermeabilization material, especially of cement, asphalt, finishing composition or similar products.

The following examples do not limit the scope of the invention. In all the examples the parts and percentages are expressed by weight unless otherwise indicated.

Determination of the Stability to $Ca^{++}$ Ions 20 grams of latex to be examined are poured into a 150 ml beaker. An aqueous solution at 10% of calcium chloride is added dropwise to the latex which is stirred with a glass rod. The number of milliliters poured until a coagulation is produced, is measured. The measurement is suspended if the coagulation has not started after the addition of 100 ml.

Determination of the Mechanical Stability

The latex to be tested is diluted with water up to a concentration of 40% by weight of dry part. 5 grams of anti-foaming agent are added and the latex is then stirred at 10,000 revs/minute for 30 minutes. The latex is then filtered by means of a 100 mesh sieve previously calibrated. The sieve is then dried, after filtration, for 30 minutes at 140° C. and then weighed. The result is expressed in weight % of dry residue per 100 grams of latex.

Dry Extract

The content of dry matter of the latexes is determined by eliminating the water and other volatile compounds starting from a previously weighed sample, at 145° C. in a vacuum oven. The dry extract is expressed in weight % with respect to the weight of the initial sample.

Chemical Stability

The different ingredients of an adhesive formulation are added under stirring and the stability of the latex is observed. The ingredients are:

|  | PARTS BY WEIGHT | |
| --- | --- | --- |
|  | Dry | Liquid |
| Latex at x% of solid | 100 | 100/x.100 |
| Tacking resin | 17.5 | 17.5 |
| Toluene |  | 7.9 |
| Disproportioned rosin | 35 | 35 |
| Dibutylic glycol | 11.8 | 11.8 |
| Oleic acid | 1.9 | 1.9 |
| Ammonium caseinate 10% | 2.37 | 23.7 |
| Anti-foaming agent | 0.8 | 8 |
| Sodium carbonate at 10% | 0.59 | 5.9 |
| Water |  | 11.7 |
| Sodium carbonate at 10% | 0.24 | 2.4 |
| Water |  | 2.9 |
| Active ZnO | 7 | 7 |
| Melamine resin | 11.8 | 11.8 |

The test is positive if there is no destabilization during the preparation and storage of the formulated glue.

The test is negative if there is destabilization of the latex.

EXAMPLES

Example 1

The surface-active agents used are Emulsogen EP (secondary n-alkane sulphonated of Hoechst), Genapol OX 030 (polyglycolic ether based on fatty alcohol with a chain length of between 2 and 15 carbon atoms+3 moles of ethyleneoxide of Hoechst, HLB=8), Sapogenat T 300 (tributylphenol polyglycolether containing 30 moles of ethyleneoxide of Hoechst, HLB=17).

The reactor is charged with:

| Chloroprene (CP) | 30 parts |
| --- | --- |
| Methacrylic acid (AMA) | 0.90 parts |
| Emulsogen EP (Ea1) | 0.60 parts |
| Genapol OX 030 (Eb1) | 0.30 parts |
| Sapogenat T 300 (Eb2) | 0.00 parts |
| Water | 22 parts |
| n-DDM | 0.02 parts |

Polymerization is carried out at 35° C. in a nitrogen atmosphere at a pH of 4.5 regulating a suitable flow rate of initiator consisting of an aqueous solution at 4% of sodium persulphate (Step A).

When the conversion has reached 6.5% (30 minutes), the following products are sent to the reactor with a constant flow rate in 300 minutes (step B):

| Chloroprene (CP) | 65 parts |
| --- | --- |
| Methacrylic acid (AMA) | 4.1 parts |
| Emulsogen EP (Ea1) | 1.4 parts |
| Genapol OX 030 (Eb1) | 1.7 parts |
| Sapogenat T 300 (Eb2) | 1.5 parts |
| Water | 48 parts |
| n-DDM | 0.48 parts |

At the end of the above addition the conversion degree is 85%. The polymerization reaction is left to continue for 90 minutes (conversion degree=99%) (Step C).

The polymerization is stopped by the addition of an emulsion of chloroprene containing 0.01 parts of butyl catechol and 0.003 parts of phenothiazine. Sodium carbonate is added to bring the pH to 7.00 and the residual monomer is then eliminated in a vapor stream. The latex after stripping has a solid content (dry extract) of 58%.

There is no fouling of the reactor.

The stability of the latex is determined as described above:

| Mechanical stability | <0.1 |
| --- | --- |
| Stability to $Ca^{++}$ ions | >100 |
| Chemical stability | excellent |

Comparative Examples 1C–5C, 10Cb–11Cb and Examples 6–9

With the exception of comparative examples 10Cb and 11Cb in which the polymerization is carried out according to the batch process, all the polymerizations are carried out as in example 1, i.e. with step A batch and step B with feeding in continuous. The comparative examples from 1C to 5C and 10Cb–11Cb and the examples from 6 to 9, and relative results, are shown in tables 2 and 3.

TABLE 2

|  | 1C | 2C | 3C | 4C | 5C |
|---|---|---|---|---|---|
| Step A (batch) |  |  |  |  |  |
| CP | 30 | 30 | 30 | 30 | 30 |
| AMA | 1.5 | 0.9 | 0.9 | 0.9 | 0.9 |
| Ea1 = EP | 0.6 | 0.6 | 0.6 | 0.4 | 1 |
| Eb1 = OX 030 | 0.3 | 0.3 | — | 0.3 | 0.3 |
| Eb2 = T 300 | — | 0.5 | — | — | — |
| WATER | 22/ | 22 | 22 | 22 | 22 |
| n-DDM | 0.02 | 0.02 | 0.02 | 0.02 | 0.02 |
| Step B (in continuous) |  |  |  |  |  |
| CP | 65 | 65 | 65 | 65 | 65 |
| AMA | 3.5 | 4.1 | 4.1 | 4.1 | 4.1 |
| Ea1 = EP | 1.4 | 1.4 | 1.4 | 1.6 | 1 |
| Eb1 = OX 300 | 1.7 | 1.7 | 2 | 1.7 | 1.7 |
| Eb2 = T 300 | 1.5 | 1 | 2 | 1.5 | 1.5 |
| Water | 48 | 48 | 48 | 48 | 48 |
| n-DDM | 0.48 | 0.48 | 0.48 | 0.48 | 0.48 |
| Temperature | 35° C. | 35° C. | 35° C. | 35° C. | 35° C. |
| Reaction inhibition | 180' | 30' | no | 180' | no |
| Conversion degree | — | — | 90% | — | 90% |
| Dry extract | — | — | 50% | — | 50% |
| Times | — | — | 9h | — | 9h |
| Fouling | — | — | no | — | yes |
| Mechanical stability | — | — | <0.1 | — | no |
| Stability $Ca^{++}$ ions | — | — | >100 | — | no |
| Chemical stability | — | — | no | — | — |

TABLE 3

|  | 6 | 7 | 8 | 9 | 10Cb | 11Cb |
|---|---|---|---|---|---|---|
| STEP A (batch) |  |  |  |  |  |  |
| CP | 30 | 30 | 30 | 30 | 98 | 95 |
| AMA | 0.9 | 0.9 | 0.9 | 0 | 2 | 5 |
| Ea1 = EP | 0.5 | 0.6 | 0.6 | 0.5 | 2 | 2 |
| Eb1 = OX 030 | 0.3 | 0.5 | 0.3 | 0.3 | 1.25 | 1.25 |
| Eb2 = T 300 | 0 | 0 | 0.2 | 0 | 1.25 | 1.25 |
| Water | 22 | 22 | 22 | 22 | 65 | 65 |
| n-DDM | 0.02 | 0.02 | 0.02 | 0.02 | 0.02 | 0.02 |
| STEP B (in continuous) |  |  |  |  |  |  |
| CP | 65 | 65 | 65 | 65 | — | 0 |
| AMA | 4.1 | 4.1 | 4.1 | 0 | — | 0 |
| Ea1 = EP | 1.4 | 1.4 | 1.4 | 1.4 | — | 0 |
| Eb1 = OX 300 | 1.7 | 1.7 | 1.7 | 1.7 | — | 0 |
| Eb2 = T 300 | 1.5 | 1.5 | 1.5 | 1.5 | — | 0 |
| Water | 48 | 48 | 48 | 48 | — | 0 |
| n-DDM | 0.48 | 0.48 | 0.48 | 0.48 | — | 0 |
| Temperature (° C.) | 35 | 35 | 35 | 35 | 45 | 45 |
| Inhibition (min.) | 10 | no | 15 | 15 | — | 120 |
| Convers. degree | 98% | 98% | 98% | 94% | 99% |  |
| Dry extract (%) | 57 | 57 | 57 | 53 | 61 | — |
| Times (hours) | 8 | 8 | 8.25 | 8 | 9 | — |
| Fouling | no | no | no | no | no | — |
| Mechanical stability | <0.1 | 0.1 | <0.1 | <0.1 | <0.1 | — |
| Stability to $Ca^{++}$ | >100 | >100 | >100 | >100 | >100 | — |
| Chemical stability | exc. | exc. | exc. | weak | no | — |

CONSIDERATIONS ON EXAMPLES 1 and from 5 to 9 and on comparative examples from 1C to 5C and 10Cb and 11Cb.

Comparative example 1C shows that under certain experimental conditions the quantity of AMA in the mixture of step A is preferably lower than 1.5 parts per 30 parts of chloroprene.

Examples 2C and 8C show that it is preferable, under the conditions of the example, not to use in step A a high quantity of non-ionic surface-active agent (Eb2) with an HLB>11. In fact, its presence may cause inhibition of the polymerization.

Example 3C shows that it is preferable to have the presence of the sulphonated product (Ea1) and non-ionic product (Eb1) with an HLB<11, in the mixture of step A. If there is no Genapol OX 030 (Eb1), the polymerization is more difficult (lower final conversion degree) and the product is not chemically stable.

As far as the surface-active agent (Ea1) Emulsogen EP (sulphonated) is concerned, in the initial mixture, if the quantity is small (example 4C) there is a prolonged inhibition. If the quantity is high, (example 5C), there is the formation of small particles and consequently fouling of the reactor and a limited solid content.

Example 9 shows that it is preferable to have a total quantity of AMA which is more than 3 parts by weight.

With respect to examples 10C and 11Cb (batch process), the latex is not chemically stable in the case of example 10Cb, and the process does not function in the case of example 11Cb.

Example 13
Adhesive properties of the latexes of example 1.
13.1—Evaluation tests.
T1=initial adhesion strength cotton/cotton
The test is carried out as follows:
a) Preparation of the samples.
For each test the following pieces of fabric are cut (reference 1471 raw material—texture 29×116, weight 380 g/m², of Gaillard et Cie.: 201 Avenue André Maurois—B.P. N° 7—76360 Barenton—Tel. 16.35.91.25.74):
 3 strips of 2×15 cm,
 3 strips of 2.5×15 cm,
 a reference point is marked at 10 cm from the shorter side.
b) Gluing.
 3 series of fabric samples are stuck to siliconed paper with sticky tape,
 a first layer of glue is applied,
 it is left to dry for 10 minutes,
 a second layer of glue is applied,
 it is left to dry for 20 minutes,
 the samples are stuck and passed in the press for a series of 3 for 30 seconds at a pressure (indicated on the manometer) of 6 bars,
 detaching tests are carried out after a storage of 1 hour at 23° C. and a storage of 48 hours at 23° C.
c) Dynamometric tests.
 These are carried out on an Instron dynamometer with 3-sample clips, descent rate of the trolley of 5 m/mn.
d) Expression of the results.
 the average value of the curve is obtained on the recorder and is expressed in kg/cm, i.e.: value indicated divided by 6.
T2=shear strength wood/wood
a) type of samples:
 the samples are made of beech wood (heart). The above samples must be stored for at least 15 days before use in an atmosphere of 50±5% of relative humidity. Under these conditions, the samples are at 10% of humidity.
 Dimension of the samples: length 100 mm, width 20 mm, thickness 5 mm, glued surface 400 mm².
b) Gluing—Operating procedure.
 The samples are dried with a clean cloth impregnated with methyl ethyl ketone.
 They are left to dry for 15 minutes before spreading.
 spreading.
 Glue latex=a layer with a flat 12 mm brush. Glue solvent=2 layers.
 Weight of the humid glue deposited: 150 g/m².
 Gluing: 20 minutes after spreading.

Pressing: 30 seconds at 2 kg/cm$^2$. This pressure is the effective pressure in the glue joint.

Conditioning before the tests: the assembled samples are stored at a temperature of 23° C. in an atmosphere of 50±5% of relative humidity.

2 types of test are carried out, one after 4 hours of conditioning and the other after 8 days of conditioning.

c) Dynamometric tests:

on an Instron dynamometer with 3-sample clips, descent rate of the trolley of 5 m/mn.

d) Expression of the results.

The average value of the curve is obtained on the recorder and is expressed in kg/cm, i.e. indicated value divided by 6.

13.2 RESULTS

As far as the adhesive properties are concerned, the initial adhesion strength cotton/cotton of the latex of example 1 is 1.5 kg/cm, and after 48 hours at 23° C., 6.3 kg/cm; on the contrary for the latex of comparative example 10Cb, the corresponding initial value is 0.8 kg/cm and after 48 hours at 23° C., 5.5 kg/cm.

The shear strength wood/wood of the latex of example 1 after 4 hours at 23° C. is 14.3 kg/cm$^2$ and, after 8 days, 21.5 kg/cm$^2$; on the contrary for the latex of example 10Cb, the above values are 10.8 and 14.5 g/cm$^2$ respectively.

I claim:

1. A process for the preparation of (co)polychloroprene latexes by the homopolymerization of chloroprene in a water emulsion and/or the copolymerization of mixtures of chloroprene and up to 50% by weight of other copolymerizable monomers, in the presence of at least one radical initiator and an emulsifying system which comprises:

(a) at least one non-carboxylated ionic surface-active agent (Ea1); and (b) at least two non-ionic surface-active agents (Eb1) and (Eb2) which have HLB values differing by 3 or more units, said process comprising the steps of:

(A) preparing a water emulsion comprising:
 (i) a fraction $f_1$ of a composition of (co)monomers/polymers having a polymer content of between 0 and 100% by dry weight of the composition; and
 (ii) an emulsifying system which comprises:
  (1) the non-carboxylated ionic emulsifying agent (Ea1) in a quantity of between 10 and 50% by weight of the total quantity of (Ea1) used in the process and in a quantity from 0.4 to 1.0 parts by weight, based on a total quantity of 100 parts by weight of (co)monomers;
  (2) the non-ionic emulsifying agent (Eb1) having the lower HLB value, in a quantity of between 2 and 30% by weight of the total quantity of (Eb1) used in the process and in a quantity from 0.1 to 1.0 parts by weight, based on a total quantity of 100 parts by weight of (co)monomers; and
  (3) the non-ionic emulsifying agent (Eb2) having the higher HLB value, in a quantity of between 0 and 25% by weight of the total quantity of (Eb2) used in the process and in a quantity from 0 to 0.5 parts by weight, based on a total quantity of 100 parts by weight of (co)monomers, (B) introducing a remaining fraction $f_2$ ($f_1+f_2=100$ parts by weight) of said composition of (co)monomers/polymers and the rest of the emulsifying system into the water emulsion of step (A) to enable the polymerization to develop, wherein the total quantity of the emulsifying system used in the process comprises, based on a total quantity of 100 parts by weight of (co)monomers:
 (i) from 0.6 to 3 parts by weight of (Ea1);
 (ii) from 0.5 to 4 parts by weight of (Eb1); and
 (iii) from 0.5 to 4 parts by weight of (Eb2).

2. The process according to claim 1, wherein the emulsifying system of step (A) comprises between 20 and 40% by weight of the total quantity of (Ea1) used in the process.

3. The process according to claim 1, wherein the emulsifying system of step (A) comprises between 10 and 20% by weight of the total quantity of (Eb1) used in the process.

4. The process according to claim 1, wherein the emulsifying system of step (A) comprises 0% by weight of the total quantity of (Eb2) used in the process.

5. The process according to claim 1, wherein step (A) further comprises (co)polymerizing the fraction $f_1$ until a conversion degree of at least 1% by weight is reached.

6. The process according to claim 5, wherein said conversion degree is between 3 and 80% by weight.

7. The process according to claim 6, wherein said conversion degree is between 3 and 10% by weight.

8. The process according to claim 1, wherein a seed comprising (co)polymers of an identical or different type to that of the desired (co)polymers is used.

9. The process according to claim 8, wherein the seed comprises (co)polymers that are identical to the desired (co)polymers.

10. The process according to claim 1, wherein the fraction $f_1$ comprises from 1 to 50% by weight of the reaction mixture.

11. The process according to claim 10, wherein the fraction $f_1$ comprises from 20 to 40% by weight of the reaction mixture.

12. The process according to claim 1, further comprising a step (C) which comprises allowing the (co)polymerization to continue until there is a total conversion degree of the (co)monomers to (co)polymers of at least 60%.

13. The process according to claim 12, wherein the total conversion degree is higher than or equal to 90%.

14. The process according to claim 1, wherein the emulsifying system of step (A) comprises, based on a total quantity of 100 parts by weight of (co)monomers:

from 0.5 to 0.7 parts by weight of (Ea1);

from 0.2 to 0.7 parts by weight of (Eb1) having an HLB≦11; and 0 parts by weight of (Eb2), and wherein the total quantity of the emulsifying system used in the process comprises, based on a total quantity of 100 parts by weight of (co)monomers:

from 1 to 2.5 parts by weight of (Ea1);

from 1 to 2.5 parts by weight of (Eb1) having an HLB≦11; and from 1 to 3 parts by weight of (Eb2) having an HLB≧11.

15. The process according to claim 1, wherein said composition of (co)monomers/polymers consists essentially of chloroprene.

16. The process according to claim 1, wherein said composition of (co)monomers/polymers comprises a mixture of chloroprene and up to 20% by weight an α,β-unsaturated carboxylic acid.

17. The process according to claim 16, wherein said composition of (co)monomers/polymers comprises a mixture of chloroprene and up to 10% by weight an α,β-unsaturated carboxylic acid.

18. The process according to claim 16, wherein the α,β-unsaturated carboxylic acid is methacrylic acid.

19. A process for the preparation of (co)polychloroprene latexes by the homopolymerization of chloroprene in a water emulsion and/or the copolymerization of mixtures of chloroprene and up to 50% by weight of other copolymerizable monomers, in the presence of at least one radical initiator and an emulsifying system which comprises:

(a) at least one non-carboxylated ionic surface-active agent (Ea1); and (b) at least two non-ionic surface-active agents (Eb1) and (Eb2) which have HLB values differing by 3 or more units, said process comprising the steps of:

(A) preparing a water emulsion and copolymerizing a fraction $f_1$ of a composition of (co)monomers/polymers until a conversion degree between 3 and 10% by weight is reached, wherein the water emulsion comprises:

(i) the fraction $f_1$ of a composition of (co)monomers/polymers having a polymer content of between 0 and 100% by dry weight of the composition; and (ii) an emulsifying system which comprises:

(1) the non-carboxylated ionic emulsifying agent (Ea1) in a quantity of between 10 and 50% by weight of the total quantity of (Ea1) used in the process; and (2) the non-ionic emulsifying agent (Eb1) having the lower HLB value, in a quantity of between 2 and 30% by weight of the total quantity of (Eb1) used in the process; and (B) introducing a remaining fraction $f_2$ ($f_1+f_2=100$ parts by weight) of said composition of (co)monomers/polymers, the rest of the emulsifying system introduced in (A), and the non-ionic emulsifying agent (Eb2) having the higher HLB value to enable the polymerization to develop.

* * * * *